United States Patent [19]

Naughton

[11] 4,200,565

[45] Apr. 29, 1980

[54] COUPLING AGENTS FOR THERMOSET RESIN COMPOSITES

[75] Inventor: Francis C. Naughton, Mountainside, N.J.

[73] Assignee: N L Industries, Inc., New York, N.Y.

[21] Appl. No.: 937,831

[22] Filed: Aug. 29, 1978

[51] Int. Cl.$^2$ .......................... C08K 5/10; C08K 9/04
[52] U.S. Cl. .......................... 260/31.6; 260/37 EP; 260/37 N; 260/39 R; 260/40 R; 428/403
[58] Field of Search ................ 260/31.6, 40 R, 37 EP, 260/37 N, 38, 39; 428/403

[56] References Cited

U.S. PATENT DOCUMENTS

| | | | |
|---|---|---|---|
| 2,160,372 | 5/1939 | Stark | 260/31.6 X |
| 2,329,694 | 9/1943 | Bodman | 428/403 X |
| 2,377,041 | 5/1945 | Rogoner | 260/31.6 X |
| 2,428,527 | 10/1947 | Plumb | 260/31.6 X |
| 2,666,752 | 1/1954 | Grummitt et al. | 260/31.6 X |
| 3,249,574 | 5/1966 | Meyer | 260/31.6 X |
| 3,489,707 | 1/1970 | Fry | 260/31.6 |
| 3,525,703 | 8/1970 | Iwami et al. | 260/31.6 X |
| 3,640,930 | 2/1972 | Buning et al. | 260/31.6 X |
| 3,936,403 | 2/1976 | Sakaguchi et al. | 260/31.6 X |
| 4,091,164 | 5/1978 | Schwarz | 428/403 X |

OTHER PUBLICATIONS

D. N. Buttrey, *Plasticizers,* 2nd Ed. (1957) pp. 44–45, and 119-120.

*Primary Examiner*—Sandra M. Person
*Attorney, Agent, or Firm*—Gary M. Nath

[57] ABSTRACT

Novel thermosetting resin composites containing an inorganic mineral filler and a coupling agent are provided which include a coupling agent comprising a multifunctional hydroxl bearing hydrocarbon which has been at least partially acetylated. The novel coupling agents are particularly useful in reducing the viscosity of the resin-filler blend, thus resulting in better handling characteristics and lower energy requirements for the mechanical processing of the composite blends. The composites incorporating the coupling agents disclosed are particularly useful in the production of laminating resins for use in spray-laminate operations, as well as in the manufacture of fiber glass reinforced sheet-molding compounds (SMC) and bulk-molding compounds (BMC).

15 Claims, No Drawings

COUPLING AGENTS FOR THERMOSET RESIN COMPOSITES

The present invention relates to sufactant coupling agents for the treatment of fillers employed in thermosetting resin composites. Such coupling agents serve to reduce the viscosity of the resin-filler blend and thus provide better handling characteristics and lower energy requirements for mechanical processing of the blends.

In view of the recent shortages of petroleum foodstocks which are necessary to manufacture thermosetting resins such as polyesters, epoxies, polyurethanes, phenolics, and melamines, and the expectation that such shortages will continue, there has arisen a need to incorporate larger volumes of inexpensive filler products into such polymers. The fillers function as extenders, and in certain cases, as reinforcing aids to improve the mechanical properties of the polymers in which they are incorporated.

Coupling agents or adhesion promoters are often used in filled thermoset composites to aid in the incorporation of filler into the polymer and to form an adhesive bond therebetween. The problems of using fillers in thermoset applications and the need for suitable coupling agents to aid in such use results from the complex problem of reducing viscosities in the resin-filler blend to within processible limits and at the same time ensuring that the physical properties of the molded parts are not harmed and are in fact improved.

The primary emphasis in the literature on coupling agents for fillers used in the preparation of thermosetting resin composites has been on silane and titanate based materials. Examples of silanes which have been employed as coupling agents include materials containing epoxy, diamine, mercaptan, 3-chloropropyl, cationic styryl, phenyl and methacrylate functional groups. The organic titanates which have been used as coupling agents have included tristearyl titanate and titanium methacrylate derivative thereof. However, the prior art silanes and titanates have been found to be minimally effective in reducing viscosity in the fillerprepolymer pastes and, in some cases, to detract from surfactant properties.

A new class of filled thermosetting resin compositions employing a surfactant coupler has now been found which exhibits improved wetting, processability, and flow characteristics, particularly in the case of spray-laminate resin composites incorporating aluminum trihydrate (ATH). Such compositions comprise a thermosetting resin which contains an inorganic mineral filler and a coupling agent comprising a multifunctional hydroxyl bearing hydrocarbon which has been at least partially acetylated. More particularly, the coupling agent comprises a compound selected from the group consisting of glycols, polyglycols, polyols, and polyglycerols, in which at least one hydroxyl group has been replaced by an acetyl radical (CH$_3$CO—).

Specific examples of multifunctional hydroxyl bearing hydrocarbons from which the coupling agents of the present invention can be prepared by partial or complete acetylation would include ethylene glycol, propylene glycol, neopentyl glycol, pentaerythritol, glycerine, and trimethylol propane. More particulary, in a preferred embodiment of the present invention the coupling agent comprises acetylated trimethylol propane which is represented by the following structural formula:

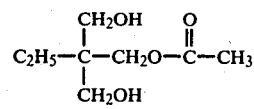

The coupling agents of the present invention may be used with a variety of inorganic mineral fillers including silicas, metal silicates, metal oxides, hydrated aluminum oxides, antimony trioxide, calcium carbonate, and combinations thereof. Additionally, the thermosetting resins from which polymer-filler systems employing the coupling agents of the present invention are prepared may include polyesters, epoxies, polyurethanes, phenolics, and melamines. Typically, the coupling agent will be present in an amount of from about 0.2–3% by weight of the filler, and preferably about 1% by weight of the filler, and may be included in the resin-filler blend in accordance with techniques known generally in the art. For example, the resin and filler can be thoroughly mixed and the coupler added thereafter to the blended mass, with continued agitation to give proper distribution of the coupler. Alternatively, the filler can be treated directly with the coupling agent to obtain a predispersed-precoated filler for subsequent addition to the resin.

In a preferred embodiment of the present invention, acetylated trimethylol propane is used to prepare a spraylaminating resin-filler blend of polyester incorporating aluminum trihydrate (ATH) filler. ATH is well recognized as a low-cost flame retardant filler since it undergoes an endothermic release of water vapor at 230°–300° C. which will quench a flame and reduce smoke. Thus, ATH was used in the composition in order to improve the physical characteristics and flame-retardant properties of the finished laminate. As will be demonstrated by the detailed examples below, the acetylated trimethylol propane proved extremely effective in reducing the viscosity of the resin-paste composites. Such reduction in viscosity can permit the incorporation of additional fillers for economic savings and can improve the flow characteristics and processing of blends and spraying operations. The ability to use higher filler loadings with improved physical properties of the cured laminate are, of course, desirable and allow for substantial cost reductions. Additionally, the reduced viscosities result in better handling characteristics and lower energy requirements for mechanical processing of the composite blends.

The following detailed examples are given to illustrate the present invention, but are not deemed to be limiting thereof. All percentages given are based upon weight unless otherwise indicated.

EXAMPLE 1

In order to determine the effectiveness of acetylated trimethylol propane as a coupling agent in the preparation of a polyester thermoset laminating-resin composite utilizing an ATH filler, a composite-laminating blend of the following composition was prepared:
Synrez 35.3 Laminating Resin*—300 parts
ATH filler—400 parts
Coupling Agent (acetylated trimethylol propane) —21 parts

*Polyester laminating resin manufactured by Synrex Chemical Corp.

The sample was prepared by mixing the resin and ATH, blending for 5 minutes and thereafter, adding the coupler. An additional 5 minutes of blending was continued prior to measurement of viscosity of the composites. Viscosities were measured with a Brookfield Viscometer at 77° F. using a #3 spindle at 2 rpm and 20 rmp rotation. The viscosities were also obtained for a control blend which contained only the resin and ATH without the coupler. The results of such tests indicating the viscosities of the samples tested in Centipoise (cps) are set forth in Table I below:

TABLE I

| SAMPLE EVALUATED | Viscosity | |
| --- | --- | --- |
| | cps at 2 RPM | cps at 20 RPM |
| Control (no coupler) | 10,600 | 3,895 |
| Acetylated trimethylol propane | 5,800 | 2,250 |

A comparison of the above viscosities shows that the use of acetylated trimethylol propane as a coupling agent improved the viscosity approximately 45% over the control at 2 rpm and 42.2% over the control at 20 rpm.

EXAMPLE 2

The procedure followed in Example 1 was repeated with the level of the coupler lowered from 3% to 1.5%, i.e. 300 parts resin, 400 parts ATH filler, and 10.5 parts acetylated trimethylol propane coupler. Three separate runs were conducted and the viscosity again measured at 2 rpm and 20 rpm rotation. The results of such experiment are set forth in Table II as follows:

TABLE II

| Run No. | Sample Evaluated | Viscosity | |
| --- | --- | --- | --- |
| | | cps at 2 RPM | cps at 20 RPM |
| | Control (no coupler) | 10,600 | 3,895 |
| 1 | Acetylated Trimethylol propane | 6,700 | 2,300 |
| 2 | " | 6,400 | 2,235 |
| 3 | " | 7,100 | 2,430 |

The above results show a reduction in viscosity of from about 33–40% at 2 rpm and 37.6–42.6% at 20 rpm. Thus, the results obtained using a reduced level of coupler over that utilized in Example 1 confirmed the original results obtained therein.

EXAMPLE 3

A diversified technique was used to determine the effectiveness of acetylated trimethylol propane when applied directly to the ATH filler. Thus, ATH filler was pretreated with 1.5% by weight of acetylated trimethylol propane and placed on a sieve shaker in order to give good coupler distribution. Four hundred parts of coated ATH filler was then added to 300 parts polyester laminating resin and after 10 minutes of processing, checked for viscosity according to the technique set forth in Example 1. The results obtained during 3 separate runs at 2 and 20 rpm respectively are set forth in Table III as follows:

TABLE III

| Run No. | Sample Evaluated | Viscosity | |
| --- | --- | --- | --- |
| | | cps at 2 RPM | cps at 20 RPM |
| | Control (no coupler) | 10,600 | 3,895 |
| 1 | ATH coated with 1.5% Acetylated Trimethylol propane | 4,200 | 1,520 |
| 2 | ATH coated with 1.5% Acetylated Trimethylol propane | 4,900 | 1,850 |
| 3 | ATH coated with 1.5% Acetylated Trimethylol propane | 3,400 | 1,510 |

The results of Example 3 indicate that a greater reduction in viscosity is obtained when utilizing a filler that has been pretreated with the coupling agent that when the coupling agent is added to the previously prepared resin-filler blend. Thus, the results obtained in Experiment 3 showed a viscosity improvement at 2 rpm of 53.7–67.9% over the control and 52.5–61.2% at 20 rpm.

Although the present invention has been described with specific reference to low-load formulations for use in spray laminate applications, it will be appreciated that the reductions in viscosity that are obtained when utilizing the coupling agents of the present invention can also be quite advantageous in more highly filled systems used in the manufacture of sheet-molding compounds and bulk-molding compounds. For example, the molded articles formed from filler and glass-loaded pastes prepared in accordance with the present invention can be used in automobile manufacture on hoods, trunk covers, panels and the like, as well as in boats, appliance housings and parts, and in housings and parts for electrical equipment and electronic instruments. Still other applications in the industrial area include tanks, pipes, dies, moldings, and other plant equipment. Additional examples of polyester formulations which normally employ lower filler loadings would also include fiber glass cloth-laminates, and fiber glass-polyester body solders. In all such applications, increased filler loadings can be employed without harmfully affecting the rheology and flow properties of the loaded prepolymer. In this regard, and with particular reference to the application of the present invention to spray-laminate compositions, such laminate compositions will be applied in typical layup fashion, where the layers of composite are sprayed directly onto the material being bonded, one coat after another. If desired, peroxide may be used in the systems to act as a catalyst for rapid curing of the layers.

The invention being thus described, it will be obvious that the same may be varied in many ways, such variations are not to be regarded as a departure from the spirit and scope of the invention, and all such modifications are intended to be within the scope of the following claims.

What is claimed is:

1. A composition comprising a thermosetting resin containing a particulate inorganic mineral filler and a coupling agent in the amount of from about 0.2 to 3% by weight of said filler, said coupling agent comprising a multifunctional hydroxyl bearing compound which has been at least partially acetylated.

2. The compostion of claim 1 wherein said compound is selected from the group consisting of glycols, polyglycols, polyols and polyglycerols.

3. The composition of claim 2 wherein said compound comprises a glycol and is selected from the group consisting of ethylene glycol, propylene glycol, and neopentyl glycol.

4. The composition of claim 2 wherein said compound comprises pentaerythritol.

5. The composition of claim 2 wherein said compound comprises glycerine.

6. The composition of claim 2 wherein said compound comprises trimethylol propane.

7. The composition of claim 6 wherein said trimethylol propane has been one-third acetylated.

8. The composition of claim 1 wherein said inorganic mineral filler is selected from the group consisting of silicas, metal silicates, metal oxides, hydrated aluminum oxides, antimony trioxides, calcium carbonate, and combinations thereof.

9. The composition of claim 1 wherein said coupling agent is present in an amount of from about 1% by weight of said filler.

10. The composition of claim 1 wherein said thermosetting resin is selected from the group consisting of polyesters, epoxies, polyurethanes, phenolics, and melamines.

11. A composition comprising a themosetting resin containing a particulate inorganic mineral filler and a coupling agent in the amount from about 0.2 to 3% by weight of said filler, said coupling agent comprising acetylated trimethylol propane.

12. The composition of claim 11 wherein said thermosetting resin comprises a polyester laminating resin.

13. The composition of claim 12 wherein said inorganic mineral filler comprises aluminum trihydrate.

14. The composition of claim 1 wherein the mineral filler is coated with the coupling agent.

15. The composition of claim 11 wherein the mineral filler is coated with the coupling agent.

* * * * *